United States Patent
Kuskey et al.

(10) Patent No.: US 10,984,443 B2
(45) Date of Patent: *Apr. 20, 2021

(54) CALL TRACKING

(71) Applicant: Invoca, Inc., Santa Barbara, CA (US)

(72) Inventors: Garvan Michael Kuskey, Santa Barbara, CA (US); Lauren Kimberly Harris, Carpinteria, CA (US); Colin D. Kelley, Santa Barbara, CA (US)

(73) Assignee: Invoca, Inc., Santa Barbara, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 16/689,011

(22) Filed: Nov. 19, 2019

(65) Prior Publication Data

US 2020/0090211 A1     Mar. 19, 2020

Related U.S. Application Data

(63) Continuation of application No. 15/379,200, filed on Dec. 14, 2016, now Pat. No. 10,515,388.

(60) Provisional application No. 62/269,759, filed on Dec. 18, 2015.

(51) Int. Cl.
*G06Q 30/02*     (2012.01)
*H04M 3/51*     (2006.01)
*H04L 29/08*     (2006.01)
*H04L 12/58*     (2006.01)
*H04M 3/487*     (2006.01)

(52) U.S. Cl.
CPC ..... *G06Q 30/0246* (2013.01); *G06Q 30/0277* (2013.01); *H04L 51/08* (2013.01); *H04L 67/146* (2013.01); *H04M 3/5158* (2013.01); *H04M 3/4878* (2013.01)

(58) Field of Classification Search
None
See application file for complete search history.

(56) References Cited

U.S. PATENT DOCUMENTS

| | | | |
|---|---|---|---|
| 8,238,540 B1 | 8/2012 | Duva et al. | |
| 8,311,890 B2 | 11/2012 | Donovan et al. | |
| 2007/0294354 A1* | 12/2007 | Sylvain | H04M 7/003 709/206 |
| 2012/0027185 A1* | 2/2012 | Fuelling | G06Q 30/02 379/88.13 |
| 2015/0120438 A1* | 4/2015 | Gilberd | G06Q 30/0246 705/14.45 |
| 2017/0017622 A1* | 1/2017 | Soundararajan | G06F 3/04842 |

OTHER PUBLICATIONS

Ger Koole et al., Queueing Models of Call Centers: An Introduction, 2002, Kluwer Academic Publishers, Annals of Operations Research 113, 41-59. (Year: 2002).*

Koole, "Queueing Models of Call Centers: An Introduction", Journal, Annals of Operations Research 113, 41-59, published in 2002, 19 total pages.

* cited by examiner

*Primary Examiner* — Christopher B Tokarczyk
(74) *Attorney, Agent, or Firm* — Baker Botts L.L.P.

(57) ABSTRACT

There are disclosed systems and methods for facilitating communications between individuals and enterprises and in particular, to methods and systems for tracking and attributing customer and/or customer prospect online and offline communications in association with a marketing campaign.

20 Claims, 5 Drawing Sheets

CALL TRACKING

RELATED APPLICATION INFORMATION

This patent application is a continuation of and claims priority from U.S. patent application Ser. No. 15/379,200 entitled "CALL TRACKING" filed Dec. 14, 2016, which claims priority to provisional patent applications: Application No. 62/269,759 filed Dec. 18, 2015, which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to facilitating communications over network.

Description of the Related Art

Although there has been a significant shift in the past decade towards the purchase of goods and services online, there are still a number of products and services purchased over the phone. However, many of these over-the-phone purchases are prompted by advertisements and promotions on the Internet. For media buyers, it is difficult to manage and measure the return on their investment for online, offline, and/or mobile advertisements that result in calls. In many cases, revenue is lost when a promotion results in a phone call that cannot be tracked back to and/or attributed to the media buyer or web property carrying the advertisement.

Currently, there are organizations that publish content of interest and/or provide certain software programs/applications to an audience of users/subscribers. Many of these organizations and distribution partners (termed "affiliates" or "publishers"), generate revenue through advertisements displayed in association with their web content and/or applications. For example, the advertisements on a web page may contain only a limited amount of information but include a link to advertiser web sites that provide further details often including a phone address (e.g., a phone number). In another example, a preinstalled or downloadable application may contain certain promotions, the promotions themselves may contain a phone address or may provide a link to an advertiser's web site often including a phone number. In another example, a customer or customer prospect may receive an email from an organization and/or an organization that publishes content of interest. The email may include a phone address or may provide a link to an advertiser's web site often including a phone number. If a customer/customer prospect calls the phone address to make a purchase from the advertiser, instead of making the purchase online, conventionally it may be difficult or impossible to determine which advertisements/promotions resulted in that lead. Such sales/lead tracking and Return On Investment (ROI) optimization is particularly challenging when there are multiple advertisements displayed on different online advertising channels while the sales transaction takes place in another medium (e.g., wireline and wireless telephony). In the case where a single advertisement is associated with a designated phone address and a suitable call tracking solution is in place, the advertisement's performance may be easily determined; all calls to the phone address and all sales that resulted from the calls are driven by the aforementioned ad. However, it is rare that an advertising campaign only consists of a single ad and that the single ad is placed in a single advertising channel. Further, it may be impractical due to a limited number of available phone numbers to provide a one-to-one relationship between a promotion and a customer/customer prospect. Therefore, a business with a series of online, offline, and/or mobile promotions (e.g., separate media outlets) will not likely be able to determine which advertisements were the most effective if all of the advertisements drive calls to one phone address.

There are various marketing channels that can be used to promote goods and services including, for example, blogs, social networking, web page visits, search, etc. Coincident with online marketing channel evolution is the emergence of software-based tools that are focused on automating the marketing process within these various channels. This automation includes marketing campaign creation, launch, tracking, and reporting. While early, and generally rudimentary, marketing automation tools were initially developed by a company internally to facilitate marketing of the products they developed, more recently an industry of third party/outsourced marketing automation tools has emerged that provide more sophisticated tools, that may be used in conjunction with certain online marketing channels, and are capable of providing tracking and reporting. Disadvantageously, the conventional marketing automation tools provided by these third-parties are generally limited to the online/Internet medium, have not been able to address the challenges posed by telephony integration, and provide limited or no telephony integration.

Many or most sales do not occur in response to a customer prospect's first interaction with a company. Generally, there are multiple customer prospect interactions before a customer decides to purchase a product or service. Conventionally, marketing campaigns include a series of one or more actions to build a relationship with a customer prospect in order to get the customer prospect to actually purchase the product or service.

DETAILED DESCRIPTION

Figure 1:
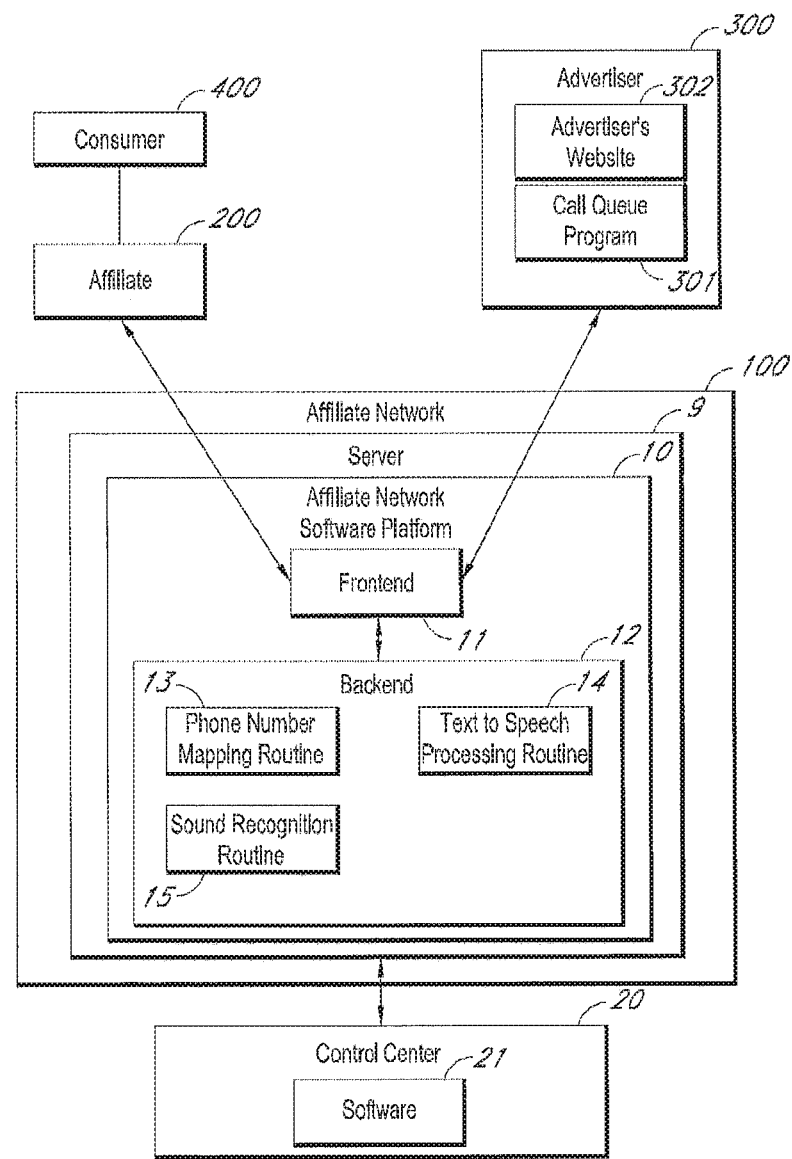
FIG. 1 illustrates a first example system architecture.

The terms campaign and marketing campaign, as described herein, are intended to encompass generally any business work flow process used to achieve a specific objective. Optionally, a campaign includes as an attribute a collection of discreet events, states, stages, or steps (e.g., the sending of an email message to a customer or customer prospect may be considered an event or be associated with a marketing stage). Optionally, conditions and/or events cause state, stages, or step transitions. Optionally, customer prospects flow through a marketing campaign and may exit a campaign in response to a condition or event such as a sale to a customer prospect, a phone call to or from a customer prospect, the completion of a series of communications to a customer prospect, etc. The terms campaign and marketing campaign as used herein are intended to be used interchangeably. For example, a campaign, may include a marketing campaign to promote a good or service for sale. In another example campaign, a marketing campaign is used to promote a company's brand. In yet another example, a notification campaign is used to notify a customer/user of a change in a company's terms and conditions. While the term campaign may be used herein with respect to certain embodiments for illustrative purposes, other types of campaigns may be used as well.

The terms phone number, telephone number, phone address, mobile device number, etc., as described herein, may refer to phone addresses that are entered/selected by users and/or customer prospects and used by public (e.g., wireline and wireless using E.164 numbering) and private networks (e.g., using Session Initiation Protocol (SIP) address and attendant parameters) to route calls/communications and create a network path between a called party and calling party. Optionally, the network path includes a transmission path for voice data and/or fax data. The term phone address is in intended to also generally encompass an address identifying a party to whom (or a destination to which) a voice call is being originated (e.g., a phone number, a SIP address, etc.). While the term phone number may be used herein with respect to certain embodiments for illustrative purposes, other types of phone addresses may be used as well.

As described above, there is a need to manage and track the sales/leads and conversion-to-purchase associated with advertisements. Certain example embodiments of a marketing and tracking system described herein enable a business to track phone-based sales through unique call processing techniques, number allocation, number pooling, web user interfaces, and reporting. In addition, certain embodiments of the marketing and tracking system can perform certain call enhancements (e.g., interactive voice response, call filtering, etc.), help manage call volumes, and/or calculate affiliate/publisher payments.

Generally, unique promotional telephone numbers (or other types of unique contact addresses) may be used to track performance across multiple media outlets. By utilizing unique phone numbers or other contact addresses, the marketing and tracking system tracks the potential customer's experience from the initial advertisement, to conversion, (specific to a designated media outlet). For online, offline, and/or mobile advertisements, a deeper level of tracking is available. By associating custom tracking parameter values that distinguish the attributes of the traffic source to the call itself, the user can then easily determine tracking granularity down to the individual advertisement level. This method of online, offline, and/or mobile tracking can be applied to, for example, search engine marketing or any online ad placements. In order to function at a large scale, accommodating thousands of simultaneous users, entire "pools" or groups of numbers, termed "RingPools", are allocated to a specific online, offline, and/or mobile media outlet (e.g., paid search keywords). Phone addresses may be accessed from a RingPool by an operator/user and/or phone addresses via a user interface of a marketing and tracking system or may be assigned automatically from a RingPool by the marketing and tracking system.

The RingPool phone number acts as a "middle man" joining the ad and its attributes to the call. Optionally, the association of the RingPool phone number and the advertisement (e.g., a paid search ad) occurs dynamically at the time the advertisement is rendered for display to a web surfer/consumer. When a user clicks on an ad, a RingPool phone number is assigned (e.g., dynamically assigned) so that when the number is called, the ad's attributes are collected. Upon completion, the call is reported in association with these attributes.

The marketing and tracking system phone number pool, RingPool, optionally includes toll-free numbers, long distance, and local phone numbers (phone numbers geographically local to a subscriber within for example the same area code and/or a local NXX). Optionally, the phone number pool includes phone numbers with extensions. Optionally, phone calls to the phone numbers can be domestic or international and can include landline, mobile, and VoIP numbers or other contact addresses. Optionally, phone calls to the numbers within the pool route through the PM system and terminate in various networks including landline, mobile, and VoIP networks. Optionally, routed or bridged calls terminate in businesses (e.g., sales and/or customer support call centers) and/or to one or more user devices (e.g., wireline or mobile devices).

Optionally, phone addresses are only recycled/reused after all of the RingPool numbers have been used in order to maintain the association as long as possible and optionally the marketing and tracking system only breaks the join/association between the number and the advertisement/keyword after the configurable, specified lifespan has expired. Optionally, the hierarchy of numbers used in the recycling process is determined by the amount of activity. Phone numbers with the least amount of activity (e.g., call activity) are recycled first while the most popular advertisements and number pairings are preserved. Once a certain amount (e.g., all) of the numbers within a pool have been used and the assigned minimum time has not been exceeded, the marketing and tracking system selects a number, which is designated within the number pool, to serve as an "overflow" number. An aspect of the "overflow" number is that the call still goes through to the correct advertiser, but the fact that it's coming in through the overflow number alerts advertisers (e.g., campaign managers) to the fact that they're out of numbers.

Optionally, phone addresses are not actually allocated to the pool until needed. So, for example, a pool of 250 numbers might only contain 100 actual phone numbers that were assigned for tracking at that instant; the remaining 150 "slots" in the pool of 250 would not be filled with actual phone numbers until later and/or when they are needed. This allows more efficient use of phone addresses in aggregate since not all pools in the system will have reached their full potential size at any given time.

When the number pool is exhausted an alarm and/or notification (e.g., provided via a Web page, an instant message (e.g., SMS, MMS), an email, a phone call, or otherwise) is optionally triggered alerting the user (e.g., a campaign manager) to increase the size of the RingPool. Optionally, the marketing and tracking system uses other number recycling activity-based techniques including but not limited to: round robin; last in, first out; first in, last out; highest activity; lowest activity; and/or other weighted distribution methods. Optionally, the marketing and tracking system can be configured to maintain the number association during the life of the campaign, even if the available numbers within a pool exhausts (e.g., by configuring the lifespan of the join to exceed the length of the ad campaign). Optionally, the marketing and tracking system determines using one or more number usage techniques if a RingPool is provisioned with an excess quantity of numbers (e.g., if one or a group of numbers have never been used over a configurable period of time or if only a certain percentage of numbers within the number pool have been used over a configurable period of time). Excess numbers/phone addresses can be removed from the RingPool and made available to other RingPools. Optionally, numbers from a terminated RingPool are placed in an idle or reserved state for either a configurable period of time (e.g., 30 days), until the number of calls to the idle numbers falls below a configurable threshold, or other idle period management technique. Optionally, the marketing and tracking system plays a reserved state audible prompt when a call is placed to a reserved state number (e.g., an out-of-service message). Optionally, the marketing and tracking system delivers the call to a configured call center destination (e.g., as an alternative to and/or in addition to playing an out-of-service message) and a party (e.g., the marketing and tracking system provider) may receive monetary compensation for delivering the call.

Optionally, the marketing and tracking system provides a collection of detailed reports on calls for each advertisement and with the specific keyword or other parameters used to track it. Optionally, the marketing and tracking system also provides a search engine and a search string used when keywords are tracked.

Optionally, the marketing and tracking system manages the phone address allocation, call enhancements, and affiliate/publisher call tracking over the course of an advertiser's campaign. There are several types of example marketing campaigns and different combination of example campaigns described below. Campaign types may include but are not limited to: direct advertising—a campaign supported by the marketing and tracking system but not promoted by affiliates/publishers; regular pay-per-call—phone-based ad campaign promoted by affiliates/publishers; Cost-Per-Acquisition (CPA)—phone-based ad campaign promoted by affiliates/publishers in which payouts are based upon whether the call resulted in a sale; RingOut—outbound phone-based ad campaign in which calls are placed to consumers. The marketing and tracking system also supports pay-per-call campaigns in which a Network manager/user organizes and manages one or more campaigns on behalf of one or more advertisers. Further, the system supports bundled campaigns in which a user (e.g., a Network manager of multiple campaigns) provides publishers and affiliates access to more than one ad campaign that share a common theme or "vertical" (e.g. insurance) and the user configures the allocation of incoming calls (e.g., calls generated by publishers and affiliates) across the bundle of advertiser campaigns. Optionally, the marketing and tracking system further supports syndicated campaigns, where calls cascade from one network, advertiser, or publisher to another. The calls may optionally be connected using the public telephone network. In a preferred embodiment, the audio (or fax/data) streams are directly routed by the platform between the final end points, thus eliminating telecom costs for the intermediate call legs and also increasing audio (or fax/data) quality since there is no additional voice packet delay for the syndicated call legs. The platform can manage payouts and track payout qualifications such as across networks where it would not be feasible or cost effective for disparate systems to do so.

Advertisers and/or Marketers can also set up campaigns where certain target budgets are established for a campaign and/or time periods within a campaign. Optionally, an advertiser may restrict the number of calls for a specified budget (e.g., threshold dollar amount) and/or for a given period (e.g., a daily call cap budget). Optionally, specified budget allocations can be reset daily, weekly, monthly, or with budget replenishment. Warning notifications and confirmation notifications are optionally automatically sent to the campaign manager, and calls that exceed threshold caps may get blocked (e.g., with an announcement message) or re-routed until the specified reset/replenishment occurs.

Optionally, the marketing and tracking system is provided by a single provider to an end user. Optionally, the marketing and tracking system is provided by a conventional marketing and tracking platform provider and the telephony features are provided by a separate applications provider which may be configured to integrate with the marketing and tracking platform. In the latter case, the application, optionally purchased or licensed separately, is hosted and operates within the database and infrastructure of the conventional marketing and tracking platform. In certain telephony integrated marketing environments it is highly desirable to enable the use of phone addresses (e.g., a telephone numbers) as a means of tracking customer prospect interactions, including interactions across a plurality of customer prospect access computing devices.

Before a sales/marketing campaign can be launched it needs to be designed by, for example, a marketing manager. Campaign design includes but is not limited to establishing target sales objectives, choosing campaign offline/online media and channels, defining campaign elements, campaign messages, etc. Optionally, the defined campaign elements and/or media elements include, for example, direct mail templates, email templates, web landing pages, web forms, web ads, search, video programs, mobile ads, social media, microblogging, social network account, virtual events, etc.

Optionally, the defined campaign element and/or media element are assigned a phone address by a user/operator via the marketing and tracking platform. Optionally, the defined campaign element and/or media element are assigned a phone address automatically by the marketing and tracking platform. Optionally, the automatic assignment of a phone address to a campaign and/or media element occurs at least partly in response to a triggering event or condition. Example triggering conditions may include the display of a web-based landing page to a customer prospect, the opening of an email, a visit to a social networking page, or the download of an application or media by a customer prospect. The triggering event or condition of a number assignment (and which type of phone address to use (e.g., toll-free or local)) can further be configured by an operator via a set of filters (or additional conditions) which are established based at least in part upon information collected, known, or accessible by the marketing and tracking platform about the customer prospect (e.g., explicit and implicit attributes used in lead scoring and/or a lead score, as described elsewhere herein). For example, in a marketing campaign, if the customer prospect is known or determined to be younger than seventeen (a customer prospect attribute), a phone address may not be assigned (a filter) in an initial introductory email (a media element) or only a toll-free number might be assigned (a type of phone address). Optionally, as further described herein, the campaign/media elements, triggering events or conditions, customer attributes, lead scores, etc., are used to fixedly or dynamically (e.g., in substantially real-time) route inbound and outbound calls to configured destinations/phone addresses, optionally, wherein the call/communications is bridged through the system for the duration of the communication/call. Further with respect to the assignment of a phone address to a marketing campaign, optionally, a phone address is manually assigned by an operator/user and/or the phone address is automatically assigned to a stage in a marketing campaign, wherein stages in a marketing campaign (and/or marketing funnel) can include but are not limited to one or more of the following stages: a null state (e.g., a state prior to campaign entry), pre-launch campaign or staging state (e.g., a customer prospect (including a customer account) placed and/or selected for a campaign), marketing funnel states, campaign exit states, and/or other marketing campaign states that may be utilized in the marketing and tracking system. Optionally, a customer prospect transitions through marketing campaign states and/or stages of the marketing campaign and/or exits a marketing campaign in response to certain user/operator actions (e.g., placing customer prospect/leads into a marketing campaign), certain determined attributes of the customer prospect and/or attributes associated with a customer prospect, triggering campaign event (e.g., campaign media element presentation, campaign promotion delivery, marketing campaign stage/state timeout, etc.), and/or the detection of certain customer prospect actions (e.g., detecting that the customer prospect has selected an online promotion, downloaded a white paper, placed a phone call, etc.), as further described herein.

Optionally, in the campaign design stage, the user also defines and/or configures dashboards and reports to be used during the campaign. Optionally, the user also plans for one or more test offers, optionally including AB testing. Optionally, at this stage (or at another stage), the integration of voice and fax telephony services is included in the campaign definition. For example, at this stage of the marketing funnel, phone addresses are presented/placed in the online and/or offline media (e.g., television advertisements, radio advertisements, newspapers, etc.). Optionally, phone services are included in initial emails to the target customer prospect. Optionally, phone services are used later in the funnel if, for example, if a web landing page is displayed in response to a customer prospect clicking on a link in one or more emails that causes a landing page to be presented to a customer prospect via a user browser hosted on a customer prospect's personal/mobile computing device. Optionally inbound calls to displayed phone numbers/addresses (e.g., displayed in a media element as described herein) are routed/bridged to a call center or an inbound sales center through a call processing platform.

Once a campaign is designed, one or more campaigns can be created or defined. A user, for example a marketing manager, accesses over a data network a system, for example a marketing and tracking system with integrated telephony, using, for example, a web-browser, a dedicated application, or otherwise. The user is assigned a unique identity within one or more accounts of the marketing system. The user enters a unique identifier and/or password to gain access to the marketing and tracking system.

After authentication by the system, optionally the marketing and tracking system presents a user interface, for example a dashboard or home page, enabling the user to, among other things, create a marketing campaign by selecting, for example, an account marketing module user interface tab or control. The user identifies the campaign, for example by entering an identifier for the campaign (although the identifier may be entered or edited later in the process).

The marketing manager configures the campaign into the system. The following example embodiments of a marketing and tracking system illustrate various example types of marketing campaigns, campaign tactics, campaign metrics, and associated system features in various marketing channels, in conjunction with discussions regarding telephony integration.

Once a marketing campaign is created, the marketing manager/operator/agent enters customer prospects into the marketing campaign, for example, via a user interface of the marketing and tracking system. For example, customer prospects may optionally be entered into a campaign for campaign targeting by importing a list of email addresses, instant message addresses, and/or telephone addresses associated with the customer prospects. Optionally, customer prospects for a marketing campaign are entered by the operator selecting existing customers from, for example, a list, by selecting a database of customer prospects (e.g., operated by a third party or maintained by the marketing and tracking system) and/or by the operator defining certain characteristics/attributes of customers or customer prospects (e.g., gender, age, household income, marital status, education, ethnicity, location, interests, etc.) in a query of a database of customer prospects.

Optionally, the operator selects customer (either existing customers or customer prospect) attributes from a user interface display of attributes (e.g., a menu of attributes) or via entry into a field(s) of one or more search/data base queries. Optionally, once the operator defines a criterion or a set of criteria, the marketing and tracking system automatically enters one or more (e.g., all) customers meeting the criteria into the marketing campaign. Optionally, the criteria and/or circumstance for entering a customer prospect into a marketing campaign can include but is not limited to one or more of the following examples (or any specified combination thereof): a customer prospect visit to a specific web site, a customer prospect action at a website, a customer prospect download of or an action in an preinstalled/downloadable software program or application (including any network-based application such as a smartphone application, tablet application, smart watch application, or any personal computing device application of a customer or customer prospect), a social media interaction (e.g., a visit to a social media page, a social media like, a messaging event on a social media page, keywords used on a social media page, a posting, a video and/or photo posting, etc.), the receipt of a communication (e.g., an instant message, a social networking message, an email, a text message, an SMS/MMS message, etc.), a detected/determined location of a user (e.g., using the GPS of a customer prospects mobile computing device (e.g., a tablet computer, a mobile phone, etc.)), a telephony communication event (e.g., an inbound call from a customer prospect, an outbound call to a customer prospect, a video call, a Facetime session, a Skype or other VoIP call, a received fax, instant messaging, etc.), etc. Other example triggering conditions, criteria, and circumstance for entering a user into a campaign include, for example, a lead scoring condition being satisfied or threshold lead scoring exceeded.

Optionally, a unique identity and/or account are created for each customer prospect entered into a campaign. Optionally, an identifier/handle used by the marketing and tracking system to register a customer prospect is relatively minimalistic, such as a customer prospect's geographic location or the customer's email address. Optionally, the marketing and tracking system assigns a unique account/customer number/identifier to each customer prospect. Optionally, in response to an explicit customer registration (e.g., customer prospect entering of a customer login id and/or password) an account is created and, optionally, an account number/identifier is assigned to the account.

Optionally, a call to a phone address associated with a marketing campaign, optionally including a RingPool phone address, triggers one or more scheduled events or response events. Scheduled events or response events may optionally include but are not limited to one or more of the following (or any specified combination thereof): a phone call or return phone call (e.g., a return call from a sales person or call agent); a conference call with one or more participants; a social media chat session; an instant message, iMessage, or other messaging/chat session; a Short Message Service/Multi-Media Message Service message or reply; a FaceTime, Skype, or other video-based call sessions or return call session; facsimile call response; or other communication reply or origination described herein.

An example embodiment of a marketing campaign in association with a marketing and tracking system with integrated telephony is now described. In this example embodiment, the campaign is based at least in part upon demand generation using outbound email.

A user, for example a marketing manager, logs into the system and is authenticated as described above. The user selects or enters an identifier for the campaign via the marketing and tracking system (e.g., one or more servers and associated marketing and tracking application software). Optionally, the user configures the marketing campaign by, for example, selecting a navigation control, such as campaign creation tab. Optionally, the user interface includes a number features including, for example, drag and drop, menu selections, short cut keys, auto fill, etc. to, for example, simplify campaign management and editing.

Optionally, the user/operator enters customer prospects by configuring into the campaign one or more email campaign lists from a data store of lists. Optionally, the user/operator associates one or more emails (e.g., email templates) with the one or more email campaign lists. Optionally, the user configures (e.g., via a user interface control) a phone number into the one or more email templates with the one or more email campaign lists. With respect to number configuration, a number (e.g., a single number) is, for example, configured or assigned by the marketing and tracking software in response to a user request. Alternatively, a user configures or selects a single number from a list of numbers (e.g., vanity numbers or easy to remember phone numbers) to be used in the campaign. Alternatively, a different number, selected from a pool of numbers (e.g. a RingPool) is used for each template with the one or more email campaign lists. Optionally, a different number, selected from a pool of numbers (e.g. a RingPool) is used for each template and for each email campaign list. Optionally, a different number, selected from a pool of numbers (e.g. a RingPool) is used for each template and for each email campaign list or sub-campaign list where a sub-campaign list includes certain attributes (e.g., sub-campaign lists relating to unique user demographics, user behavior, funnel stage, etc.). Optionally, as further described below, a phone number selected from a pool of numbers (e.g., a RingPool) may be assigned dynamically to each individual customer prospect in a marketing campaign. In this case, each phone number may act as a unique identifier, enabling the marketing and tracking system to track, manage, record, attribute, and/or transcribe phone-based customer interactions (e.g., offline interactions) throughout the campaign based on calls involving the assigned phone number. Optionally, the assigned phone number and other attributes, for example, the calling party's number (e.g., representing a telephony signaling attribute although a calling party's number may not consistently and reliably be provided in association with each call), together or by itself form the unique identifier to facilitate tracking and campaign management.

Optionally, different phone numbers and/or different phone number pools can be associated with different date and time triggers within the same marketing program. For example, a phone number can be modified or selected for insertion in an email template based on a send date and time.

Optionally, phone number assignments, tracking, and/or reporting can be modified during the execution of the marketing program without disrupting the campaign itself. Optionally, call management and call treatment (e.g., dynamic call routing to a backup call center) may also be performed without campaign disruption.

Optionally, the marketing and tracking system includes libraries of historical or pre-built marketing programs (e.g., best practice marketing programs) including, by way of example attached email and landing page templates. Optionally, these program libraries include integrated telephony features and number assignments as described elsewhere herein. Optionally, selected portions of, or entire marketing programs, optionally including multiple email campaigns and multiple landing pages can be cloned and edited, and new and/or unique numbers are automatically assigned to the cloned marketing program.

In an example embodiment, the number of members in a list of emails associated with a campaign may be large (e.g., number in the hundreds, thousands, or millions). Thus, it may be impractical (e.g., to acquire such an available pool of numbers) and/or cost prohibitive to assign each member in the campaign a unique phone number when a campaign is launched. Conventionally, telephone service providers may charge a user a fixed and/or monthly fee, for example, a fixed fee of $1.00 per number and $0.10 a month per local or toll-free number. In an email campaign of several hundred thousand members, these costs may be prohibitive. In addition, each area code is limited to a million phone numbers, providing a technical limitation on the number of phone numbers available for a given area code. With the proliferation of mobile devices, virtual number services, and the existing pool of land-lines, there may be a lack of phone numbers to conventionally run a large marketing campaign with integrated telephony. Further, it may be desirable to provide toll-free numbers in certain marketing campaigns which are even more impacted due to the limited number of area codes dedicated to toll-free calling.

Thus, in order to overcome some or all of the foregoing technical limitations, in an example embodiment, a phone address is dynamically assigned in an email marketing campaign in response to detecting a condition or event, rather than preassigned at the time of launch. For example, in response to an existing customer and/or customer prospect opening their marketing campaign email, a programmatic script (e.g., JavaScript) may be invoked when an email application (e.g., web browser in the case of web email) displays the opened email. Optionally, the script places a phone address (e.g., phone number) request over a data network, for example, a RingPool API number request as described below.

In the following example, a parameter(s) of the number request includes the email address of the customer/customer prospect or other identifier (e.g., an identifier associated with each email which uniquely identifies the campaign email recipient). The marketing and tracking system may associate (e.g., assign) the number request with a member of the email campaign. Optionally, a comparison is made with the received parameter in the number fetch request to verify the customer prospect is a member of the campaign. For example, an email comparison or unique identifier comparison. Optionally, the programmatic script, upon receipt of the assigned phone number, replaces a portion of text in the displayed email. Optionally, a customer/customer prospect account is created at the time of the request (or before the request, for example, during the creation of the campaign) and the dynamically assigned phone address is stored in a data store in association with the customer/customer prospect account. In addition, any customer/customer prospect tracking information received in association with the phone address request (e.g., RingPool API parameter(s)) is stored in association with the identified customer account (or a new customer account if the number request lacked an identifier). RingPool API parameters may optionally include one or more of the following: parameters from cookies earlier set on the customer/customer prospect's browser, dynamic values populated by an associated marketing automation solution (e.g., date campaign email sent (day, month, and/or year), internal campaign email name, campaign id, email viewing context (send, preview, view as web page, view sent, forward-to-a-friend, landing page, validation, link resolution, short message service, voice, social, platform, site), customer/customer prospect email type (text or HTML), email id, profile attribute full name, customer/customer prospect id, email batch id, certain campaign email account attributes (batch id, job id), email reply name and/or address, other customized defined alphanumeric strings associated with campaign correspondence), a loyalty identifier (e.g., an ID code), mobile device information (e.g., phone device, carrier, geo-location, phone address, short code, etc.) etc.

Thereafter, any calls to the assigned phone address received by the marketing and tracking system (e.g., during the marketing campaign or for other designated time period) are presumed to originate from the customer/customer prospect associated with the campaign email and are tracked, bridged, and/or routed as defined by the email campaign. Optionally, calls to the assigned phone address are routed to a sales call center and the email campaign is credited with any associated call activity and/or sales. Optionally, the marketing and tracking system stores call attributes including but not limited to: call signaling attributes; customer prospect call actions (e.g., keypress selections); customer prospect detected spoken keywords; call duration; call termination event; and other call attributes described herein.

In another example, a customer/customer prospect receives an email in association with a marketing campaign. For security and/or policy reasons, certain web email services may preclude and/or restrict the use of a programmatic script (e.g., JavaScript) to dynamically replace a portion of text in the email at the time an email is opened or viewed. However, these same web email services may allow certain image display/request in response to a condition (e.g., an opening or displaying of an email). Thus, an image request (e.g., an image Universal Resource Locator (URL) request) may be configured in an email template of the campaign emails wherein the RingPool API parameters or other attributes are attached and/or embedded in the request. The image request is transmitted to the marketing and tracking system.

In response to the received image request, the marketing and tracking system acquires an unassigned phone address from a RingPool associated with the marketing campaign and generates an image representation of the acquired phone address (e.g., a JPEG image, a .png image, or other image type). The marketing and tracking system provides as a response the generated image representation of the phone address. For example, a template email may include a phone address request in the following form: https://invoca.net/campaign_id/number.png?param1=<email>. In this example, the request is directed over a data network to an Invoca.net server (e.g., a service provider Invoca of Santa Barbara, Calif. hosting a marketing and tracking system) with a campaign id as an identifier (for example, for authentication and/or to identify the campaign), and an email recipient associated with the number request as a parameter. Optionally, the generated phone address is stored in association with the identified email recipient (e.g., the email recipient opening the campaign email) along with any RingPool API parameters and/or call attributes (in the event of a call) as similarly described in the example above.

To further reduce the number of phone addresses used in a marketing campaign, if the device type is determined prior to or during the event/condition (e.g., an open email condition), the image RingPool URL request may include device type as a parameter. If the device type supports call origination, the marketing and tracking system may respond to the request with a "call now" control (e.g., a call now button which may be activated by touch when displayed on a touch screen, by mouse, speech or other user input). Optionally, if the "call now" control is selected by the customer prospect in the opened email, a programmatic script is invoked causing a phone address request to be sent over a data network to the marketing and tracking system. Optionally, upon receipt of the phone address request (optionally, including a campaign member identifier as a parameter as described herein above) the marketing and tracking system provides a unique phone address from a RingPool assigned to the marketing campaign. The assigned phone address is used as the called number by the computing device of the customer prospect in the "call now" call origination. As similarly described in the example above, any tracking attributes passed in the RingPool API number request and any calls to the assigned phone address (and associated call attributes) are stored in association with the customer prospect account. Optionally, in this example, the assigned phone number displays as text or an image representation in response to the "call now" control selection by a customer/customer prospect. This enables the customer/customer prospect to place subsequent calls to the assigned number from other call origination services and devices. Optionally, the phone number is displayed in a pop-up dialer only for the duration of the click-to-call experience. In this latter case, optionally, the phone number is placed back into the RingPool for use in the same marketing campaign. Optionally, customer prospect attributes are received during the interaction (e.g., the customer prospects email address, call signaling information, etc.), stored by the marketing and tracking system, and used by the system to identify customer prospects in the current or subsequent states of the marketing campaign. Advantageously, the foregoing disclosed techniques further reduce the utilization of phone addresses as compared to the other example embodiments as a phone address is only assigned if the customer/customer prospect opens a campaign email and activates the call origination control.

Thus, as illustrated in the example embodiment above, if a condition or technical environment exists in which a dynamic character display is precluded but an image display is permitted, the marketing and tracking system may optionally generate an image representation of a phone address in response to an image request wherein certain parameters are attached/embedded in the request. Advantageously, the image generation approach is relatively simple to implement wherein the campaign manager may simply define a well formed image URL in their email template, and does not require significant additional hardware or bandwidth overhead. Further, no JavaScript code is required in the solution. As described above, the foregoing approach may further overcome certain restrictions and limitations imposed by certain email services. Optionally, the image generation feature may be utilized in the display of a social networking page, in a software program downloadable or preinstalled on a personal computing device of a customer/customer prospect, in other media (e.g., product and service advertisement and/or promotion), display ads or other electronic content. Thus, image generation feature and dynamic phone address may be utilized, for example in association with a marketing program, in one or more applications which may be installed on hundreds, thousands, or millions of personal computing devices.

There may be certain email Internet caching features used by email marketing providers which may produce unexpected results. In particular, certain email template images may be cached in various network servers across the Internet to enable the marketing providers to improve image display performance and/or reduce their bandwidth utilization requirements to display said images templates. This caching may have the unintended consequence of displaying the dynamic number image to two or more individuals, thereby, defeating or adversely affecting the feature of assigning a unique phone address to each user for tracking purposes. To overcome image caching of the dynamic number image response, the email marketing provider may optionally configure the image response to cause the image not to be cached, for example, by including a cache-control element in the image header. Optionally, the receipt of more than a configured threshold number of calls with unique caller IDs (e.g., more than 3 unique caller IDs) may indicate network caching. Optionally, if network caching is detected, an alarm is set and/or the user/operator or system is notified of the exception condition. The exception condition may then be processed.

Thus, certain embodiments may be utilized with a variety of campaigns that integrate telephone and online aspects. Optionally, in certain embodiments a customer/customer prospect opens an email generated in a campaign causing the display in an image of the email a unique phone address in which the phone address may be used for sales and marketing and tracking and attribution.

FIG. 1 illustrates an example marketing and tracking system architecture. The illustrated system architecture can be used to facilitate telephonic, email, SMS, and other forms of communication. Certain embodiments process and track communications to facilitate online ordering of items, such as products or services. Thus, the illustrated system architecture can optionally be used to reduce the amount of revenue that would be lost by publishers/advertisers should a consumer decide to call an advertiser to make the purchase as opposed to ordering the item online via a Website or within an application. Additionally, the illustrated system architecture can optionally be used to increase the amount of revenue generated from offline or online advertising by including promotional contact information in the offline or online media. Still further, the illustrated system architecture enables the tracking of calls associated with email campaigns.

As illustrated in FIG. 1, a consumer terminal 400 (e.g., a general purpose computer, a tablet computer, an interactive television, a phone with data network capability, a networked game console, etc.) is coupled to an affiliate via an affiliate system 200 (which optionally hosts a website on a web server) over a network (e.g., the Internet). The affiliate system 200 is coupled over a network (e.g., the Internet) with an affiliate network via affiliate network system 100. The affiliate network system 100 includes a network interface, a server 9, and an affiliate network software platform 10 which executes on the server 9. The affiliate network software platform 10 includes a frontend 11, which communicates with the affiliate system 200 and with an advertiser system 300 (which includes a website 302 hosted on a web server, a call queue program 301, and a user terminal).

The affiliate network system 100 includes a backend 12. The backend 12 includes phone number mapping software 13, a text to speech system 14, and a sound/speech detection and recognition system 15. The server 9 is coupled via a network to a control center system 20, which includes application 21. In an example process, a producer/advertiser may create a campaign and make the campaign available to an affiliate. The affiliate may then assign a phone number to the campaign and integrate the phone number into the affiliate's web site (e.g., post the number or provide a link associated with the number on a web page). A user/consumer may then place a call to the phone number and is connected to a call center associated with the advertiser. The call may be tracked and the affiliate and may be credited for the call. Optionally, the system enables the dynamic provisioning of phone address display in email campaigns.

Figure 2:
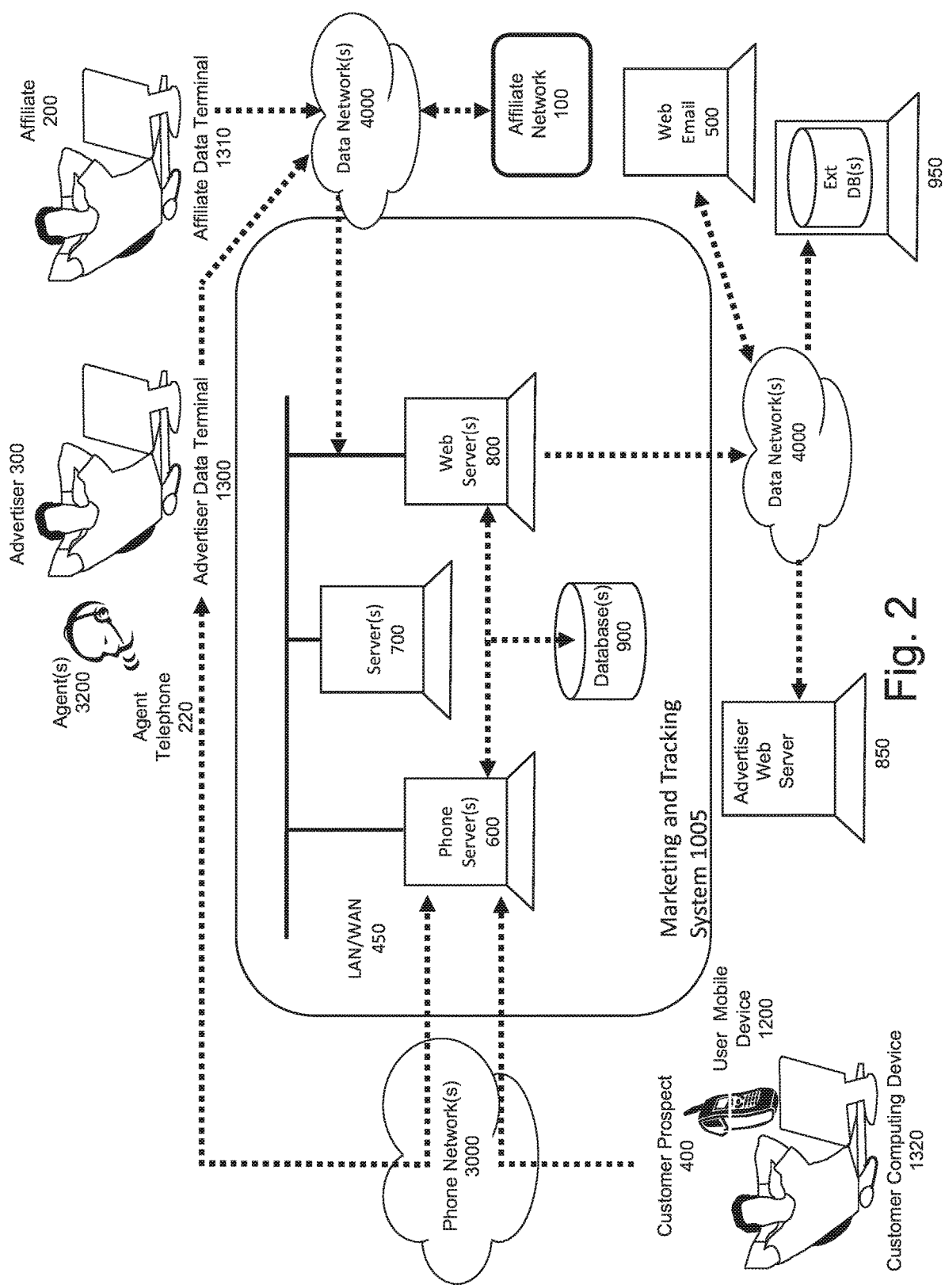
FIG. 2 illustrates a second example system architecture.

FIG. 2 illustrates another example system architecture 1005, optionally, the elements of system architecture 1005 can be included in the example affiliate network system 100 of FIG. 1. The illustrated system architecture 1005 can be used to facilitate communications between individuals and enterprises in the context of product and service promotions and customer service management. As illustrated, the system is connected or connectable to a plurality of consumers/customers/customer prospects 400 and the user's mobile device/phones 1200. The mobile phones/devices 1200 are connected to a phone (wireless) network 3000 and data network 4000. Optionally, wireline phones (not shown in FIG. 2) are connected to a phone (wireline) network 3000. Optionally, the Customer/User 400 can access one or more data networks 4000 (e.g., web sites and associated web pages, the Internet or a corporate LAN or WAN) using their mobile telephone computing device 1200 (e.g., smart phone, tablet, phablet, etc.) and/or their personal computer device 1320. The personal computer device 1320 can be a personal computing devices having a monitor, keyboard, memory, and a data communication interface. In addition, the personal computer device 1320 can be an interactive television, a networked-enabled personal digital assistant (PDA) or the like. Optionally, the system includes the Affiliate Network 100 and Control Center 20, see, for example, FIG. 1.

As further illustrated, the marketing and tracking system 1005 interacts with a plurality of advertiser and affiliate computer/data terminals 1300 and 1310, respectively. The data/computer terminals 1300 and 1310 can be a personal computer having a monitor, keyboard, memory, and a data communication interface. In addition, the computer terminal 1300 and 1310 can be an interactive television, a networked-enabled personal digital assistant (PDA), a smart/wireless phone 1500, tablet computer, phablet, or the like. The data/computer terminals 1300 and 1310 are connected to a data network 4000 (e.g., the Internet or a corporate LAN or WAN). The data network 4000 includes wireline data networks (like the public Internet accessed using dialup or DSL/cable modems) and wireless data networks (e.g., wireless mobile and WiFi data networks).

As further illustrated, the marketing and tracking system 1005 integrates with a plurality of customer service and/or sales agents 200 via the phone network 3000 and/or data network 4000. Optionally, the agents 3200 have a wireline/wireless phone and/or a phone headset 220 used to communicate with customer's/user's 400.

The marketing and tracking system's 1005 servers 600, 700, and 800 are interconnected either through Data Network 4000 or via a private Local Area Network (LAN) or private Wide Area Network (WAN) 450—as shown by the solid line connections in FIG. 2.

The marketing and tracking system 1005 in this example contains centralized databases 900 and/or general-purpose storage area, optionally including, but not limited to, some or all of the following: an advertiser, affiliate, affiliate network account database, configured campaigns and campaign attributes, phone numbers/addresses, call routing rules, call records, call recordings, advertising creatives information, etc. The detailed call transaction information associated with a call may include some or all of the following information: call signaling, call duration, call content (e.g., recording of call and conversion of recorded data), call type (e.g., inbound, outbound, fax, voice), call routing, call bridging, call termination states (far-end, near-end disconnect), voice prompting (e.g., IVR trees), caller interactions (including speech and dtmf tone), and/or other information. The detailed call transaction may be stored in in databases 900 and/or general-purpose storage areas. Optionally, the call transaction information is provided or accessed for data mining. Optionally, the call transaction information can be used and/or integrated/associated with internal and/or external databases 950 (using, for example, data network 4000) in order to, for example, collect additional information about a caller. Optionally, the stored data can be used in marketing campaigns to improve customer prospect targeting and the efficacy of the campaign (including stored explicit data and implicit data derived from other data stores). Optionally, the stored data can be used in retargeting marketing campaigns.

The marketing and tracking system 1005 in this example contains a phone server subsystem 600 with call and fax processing and call bridging capabilities. Optionally, the servers bridge and/or route calls between users, advertisers (e.g., advertiser's call center), and/or third parties (e.g., an outsourced call center). User calls optionally are received by (inbound) or originated from (outbound) the phone server subsystem 600. Additionally, advertiser/third party calls are received by (inbound) or originated from (outbound) the phone server subsystem 600. For example, a call center agent places a call to the phone server subsystem 600 and the phone server subsystem originates an outbound call to a user who expressed an interest in a product or service, or in response to a gesture on a web-page (e.g., click-to-call). These servers 600 optionally provide interactive voice response, voice messaging, voice recognition, text-to-speech services, fax server features, and voice and voice message transcription to natural-language text. Optionally, the phone server's services (e.g., text-to-speech) utilized in a call are configurable (e.g., a specific interactive voice response tree or sub-menu) and may be determined based on attributes of the caller or called party or other call quality criteria (e.g., time-of-day, terminal device of caller or called party, etc.).

The marketing and tracking system 1005 in this example includes one or more general purpose servers 700 for performing a collection of tasks including for example, general computing tasks, image processing, data analysis, data store access, etc. Optionally the one or more servers 700 are connected to data networks 4000 including the Internet.

The marketing and tracking system 1005 in this example contains a web server and general purpose server subsystem 800 with web serving and general computing capabilities.

The marketing and tracking system 1005 in this example optionally interfaces with (e.g., over a data network 4000) with one or more external web servers, including an Advertiser Web Server. Optionally, the web server(s) 800 host one or more web pages of publishers and/or advertisers. Optionally, the system 1005 redirects users to an Advertiser's Web Server 850. Optionally, the marketing and tracking system 1005 redirects consumers/users to an Advertiser's Web Server where the redirect includes one or more phone addresses from a phone number pool wherein the phone address is optionally used as a tracking element. Optionally, the marketing and tracking system 1005 generates and/or displays an image of a one or more phone addresses which may be displayed to a customer/customer prospect (e.g., when a customer prospect opens said email).

In this example, the marketing and tracking system 1005 servers 600 and 800 are optionally centralized at a given location, or distributed to a number of locations. The marketing and tracking system 1005 can be implemented as a Software as a Service (SaaS) system (e.g., a system used by a number of service providers) or the system can be integrated into a service provider's internal systems (e.g., an affiliate network). Optionally, the marketing and tracking system 1005 is connected to a data communication network 4000 and a wireline/wireless network 3000. The marketing and tracking system 1005 interconnects with the wireline/wireless network 3000 using conventional telecommunication interfaces (e.g., SS7 trunk connections, T1 trunk connections, etc.) and via data communication networks 4000 using a secure router subsystem. Optionally, an SMS server subsystem which serves as a mail relay to transmit and receive SMS and MMS messages via a Short Message Service Center (e.g., an SMSC operated by a network carrier). Optionally, the receipt of and origination of wireline, wireless, and/or data calls is via data interfaces using conventional Voice Over Internet Protocols (VoIP) connections and associated Internet telephony protocols such as Session Initiated Protocol. Optionally, inbound calls (e.g., an inbound call from a customer prospect) to the system are bridged with an outbound call (e.g., an outbound call to a call center) via an internal switching mechanism. Call bridging enables a calling party to be connected to a called party in order that the calling party and called party may communicate over the bridged connection. Optionally, the system enables a third party to be connected to a call. Optionally, the system is capable of monitoring the voice channel of all connections. Optionally, the system may be configured to enable half-duplex connections and associated monitoring. For example, enabling a supervisor to be connected and monitor a call between a customer prospect and sales agent in which the talk path from the supervisor is muted.

The marketing and tracking system may access the location of the user's mobile device 1200 by accessing a third party system or third party database which is capable of tracking the user's mobile device's location. Geographic location information and/or approximate geographic location of a caller (e.g., a customer and/or customer prospect) is optionally determined. For example, the geographic location information and/or approximate geographic location of a caller is optionally determined from call signaling information associated with an inbound call. In addition, a call signaling parameter labeled the Jurisdiction Information Parameter (JIP) in an SS7 IAM message or SIP-T parameter can optionally be used to determine geographic location information associated with the caller. In an example embodiment, the JIP parameter is populated with a NPA-NXX number (e.g., a 6 digit NPA-NXX number) when an inbound call transits from the wireless network to the wireline network. This NPA-NXX indicates a geographic area from which the wireless call originated, where the NPA portion indicates the area code from which the call originated and the NXX portion indicates the telephone office exchange from which the call originated. This information optionally can be used to transfer the call to, for example a merchant or call center location, nearest the user. Optionally, an administrator configures an IVR tree to interact with the user to, for example, ask permission to obtain the user's location information directly or from a separate data source.

Optionally, a customer/customer prospect is tracked across one or more computing devices using a persistent unique identifier. Optionally, one or more servers of the system architecture can access a persistent unique identifier platform from a provider over a data network 4000 in order to obtain user tracking information.

In another system architecture, a system/platform includes one or more networked computing servers, data stores (e.g., databases), networking infrastructure, telephony capabilities including call routing, switching, and bridging, and a collection of general purpose and specific (e.g. voice recognition) application/system software as described above. In addition to the some or all of the components described in the above two architectures 100 and 1005 above, a system/platform optionally includes a marketing and tracking software application and centralized marketing data store, software analytics, user interfaces, dashboards, and reporting. Optionally, the telephony capabilities/subsystem is configured remote and/or separate from the marketing and tracking software application/platform and its associated network-based servers and data stores. Optionally, one or more network interfaces enable data transfers between the telephony subsystems and marketing and tracking platform. Optionally, the telephony capabilities/subsystem is offered by a provider separate from the marketing and tracking platform provider and the systems are integrated via one or more Application Programming Interfaces (APIs) over a network. Optionally, telephony subsystem and marketing and tracking platform are provided via a cloud-based service and/or Software-as-a-Service (SaaS) model. Optionally, in a cloud or SaaS operational implementation, one or more of the subsystems (e.g., telephony, marketing and tracking platform, web servers, etc.) are operated by one or more service providers.

Optionally, the marketing and tracking system/platform includes a centralized marketing application which is used to create and manage the marketing programs and associated program stages, tracks each customer prospect and stores (e.g., in a centralized data store) the tracking information and any inferred and declared data associated with each customer prospect. Optionally, the marketing program is integrated with and receives detailed tracking information from numerous internal and external system providing the online and offline (e.g., telephony and call processing subsystems) customer prospect interactions including, for example, but not limited to some or all of the following: email: list storage and generation, sending, monitoring; web-site: corporate, landing pages, and microsites; blogs: postings, monitoring, and management; webinars/webcasts/videos/online courses: invitations, registrations, attendance, viewing, delivery, and posting; free trials: invitations, registrations, activity, termination; downloads: invitations, registrations, delivery status; free software: invitations, registrations, activity, termination; documents: postings, monitoring, and management; integrated or public application directory: invitations, registrations accessing, searching, perusal; widget: gadget; invitations, registrations, delivery status, type, activity/usage, updates; social media: monitoring (including a monitoring service), postings, sharing, liking, modified status; RSS/XML feed: postings, monitoring, and management; survey: invitations, registrations, completion, acknowledgement; search activity: term list management, monitoring; certifications: invitations, registrations, outcome determination, award/denial management; podcasts: invitations, registrations, activity, terminations, streaming, downloads. Optionally, the implicit and explicit data (including for example recorded phone calls and associated transcriptions) and transaction data described above are stored in one or more databases and/or general purpose data stores. Optionally, this data is available for data mining. Optionally, one or more customer prospects may be placed into a different and/or subsequent marketing campaign/program based upon an indication from the data mining that the customer prospect is likely to be interested in and/or need a product and/or service. Optionally, the customer prospect is retargeted in a marketing program based at least in part upon an analysis of the stored data associated with the marketing program. Optionally, other data may be captured with respect to marketing programs/campaigns includes, for example, program start/end dates, converted prospects, program costs in terms of both expenses and staff. Optionally, historical marketing campaigns and/or best practice campaigns and the associated data/metrics are stored and available for review, comparison, trend analysis, and/or cloning for new campaigns.

Optionally, the system/platform's one or more dashboards/reports provide staff (e.g., marketing and/or sales personnel) real-time and/or near real-time information on customers/prospects interacting with marketing media associated with the company and/or marketing campaigns. Optionally, the platform enables the distribution of these real-time customer engagements to company personnel (e.g., sales agents). Optionally, the system/platform enables the recipients (e.g., sales agents) to view information associated with the customer's/prospect's current engagement and/or other information associated with the customer/prospect including for example, attributes/characteristics, marketing program state, call events data (including, for example: call type (e.g., voice, fax, cell, video, VoIP (e.g., Google Voice), Face time, Skype, etc.); inbound or outbound; call duration; call signaling information (calling party, called party, private, charge number, direct, forwarded, busy, etc.); conferenced call; bridged call; call termination state (e.g., far-end termination, near-end, bridge); type of called number (e.g., toll-free, local, long distance); called or calling device type), etc.

Optionally, the system/platform generates alerts or notifications to sales/marketing/support/executive staff personnel in response to a condition, including in response to one or more conditions described herein. Optionally, the alerts are sent via messaging services such as email. Optionally, the alerts are sent as a text message via SMS/MMS, an instant message, a widget/gadget display, a customized client software application, and/or an outbound call. Optionally, the condition is triggered, for example, by an event such as, by way of example, one or more of the following: a time period expiration, a marketing program state transition, an attribute/characteristic of a prospect/customer determined by the system, an attribute/characteristic prospect/customer state change, a type of call or message (e.g., inbound voice call/message, outbound voice call/message, inbound fax call/message, outbound fax call/message,), content of a voice call or message (e.g., as determined by an analysis of a transcribed call or message), content of a fax call (e.g., as determined by an analysis of the text in the fax and/or certain completed fields, optionally including a signature field), etc.

Optionally, the system/platform includes one or more sales/marketing/executive-level friendly user interfaces (e.g., reports and/or dashboards) which enable one or more views and/or analysis into the stored data including, for example, trends, program performance, alerts, efficiency, program design, etc. Optionally, the system/platform includes one or more customizable views and/or analysis into the stored data which can be used by business analyst or other technical resources to build custom reports to meet specific needs of the organization and/or to derive particular insights from the data. Optionally, the data stored in the system/platform can be exported to other analytic programs/processing systems.

Optionally, the system/platform provides one or more real-time and/or near real-time information via dashboards/reports to staff (e.g., marketing and/or sales personnel) on customers/prospects interacting with marketing media or media elements associated with the company and/or marketing campaigns. Optionally, the platform enables the distribution of these real-time customer engagements to company personnel (e.g., sales agents). Optionally, the system/platform enables the recipients (e.g., sales agents) to view information associated with the customer's/prospect's current engagement and/or other information associated with the customer/prospect including for example, attributes/characteristics, marketing program state, etc. Optionally, the current information is made available (e.g., via a data network interface) to other applications/systems including, for example, a CRM (customer relationship management) application Optionally, the system/platform supports a collection of user interfaces for creating marketing programs/campaigns and for routing leads out of the funnel to the appropriate organization (e.g., customer care, sales, VIP sales, etc.) and/or individual. Optionally, the user interface is presented by a customized software client. Optionally, the user interface is presented in one or more existing sales force automation client interfaces. Optionally, the user interface is presented via standard clients including, for example, a web browser (e.g., Chrome, Firefox, Safari, Internet Explorer), and/or a mail client application (e.g., Microsoft Outlook).

RingPool API

Optionally, a user (e.g., an Advertiser, a Publisher, a Service Provider, a third-party Service Provider (e.g., a Service Provider other than a Service Provider hosting the marketing and tracking system, etc.) hosting a marketing campaign may access RingPool phone addresses via an Application Program Interface (API) over a data network. In an example embodiment of a RingPool API, there are certain references to a Customer RingPool configuration. Custom RingPools enable a campaign manager/user and/or publishers to track online sources that are driving traffic to their campaigns. With Custom RingPools multiple text string (for example, the use of three text strings is described with respect to an example embodiment below) are passed to the marketing and tracking system in a web transaction that can be used to identify the traffic source driving a specific call.

In an example embodiment, a RingPool API may comprise some or all of the following parameters.

RingPool Key: An authentication key required for each RingPool.

Param1: The first parameter of a Custom RingPool. Used only in Custom RingPool configurations.

ParamN: The nth parameter of a Custom RingPool. Used only in Custom RingPool configurations.

SearchEngine: The search engine used to process a search query. Used in either Search RingPool type.

SearchKeywords: The search query the user searched for. Used in either Search RingPool type.

SearchKeyword_id: The keyword ID that is associated with the query string. Used only in the Keyword ID Search RingPool type.

landing_page: The landing page URL to be displayed in reporting. This is an optional parameter.

referrer: Can be used instead of the two parameters "Search_engine" and "SearchKeywords". The Marketing and tracking system determines the two parameter values by parsing the referrer URL. This is an optional parameter.

mobile_click_to_call: If enabled, returns mobile enabled links that populate smartphone's dialers when clicked while not affecting conventional personal computers. This is an optional parameter.

Affiliate_ID An affiliate or publisher account ID (or other identifier that is unique to the advertiser and associated with affiliate or publisher) and is used to allocate a RingPool number on behalf of the publisher or affiliate.

Optionally the RingPool API returns a RingPool phone address and a formatted click-through URL. The response can be in any number of formats including for example, xml (EXtensible Markup Language), json (JavaScript Object Notation), or csv (Comma Separated Values).

In the example embodiments described herein a server-to-server and/or browser-to-server RingPool API (Application Program Interface) is defined to provide a dynamic number replacement on a web page. As such, the API round-trip introduces a latency in the display of the web page. From a customer and/or customer prospect web experience, it is highly desirable to display the web page fast, preferably in less than 200 milliseconds.

Conventionally, APIs using a REpresentational State Transfer (REST) architecture run over Transmission Control Protocol (TCP), which can, for example, take 100-200 milliseconds to return a result even if inside the same country as a requesting device, and often longer if crossing country boundaries. One reason for this is the TCP "slow start" protocol. The User Datagram Protocol (UDP) can have much lower latency than TCP. But browsers conventionally do not support UDP directly.

Although browsers do not conventionally support UDP directly, browsers may support name lookup by the Domain Name Server (DNS) protocol, which runs over UDP. In order to reduce latencies, a Dynamic Number server API is described that may be tunneled over DNS or other similar name server protocol.

An example embodiment of a Dynamic Number server API using DNS is now described. Conventionally, a dynamic number retrieval may be used in a search marketing campaign (e.g., a paid search marketing campaign). For example, a marketing manager may purchase one or more search keywords from a search provider. If a customer prospect places a search request for a purchased search keyword, the search engine may display one or more advertisements in association with the search response. If the customer prospect selects a displayed paid advertisement corresponding to the marketing campaign, the customer prospect may be directed to a web landing page of the advertiser (e.g., as defined by the marketing manager). Optionally, a dynamic contact address (e.g., a phone number associated with a marketing campaign) is requested (e.g., via a RingPool API) and displayed in the web landing page of the advertiser. For example, a dynamic number retrieval for a marketing campaign #1458 that is tracking a search keyword/term/query parameter identified as keyword #58 might have used a REST API at an endpoint such as the following example:

"http://api.example.com/dynamic"

with a request body such as:

{"campaign":1458,"search_keyword":58}.

An example marketing and tracking system response might look like:

{"phone_number":"8884521084"} wherein the phone number 1-888-452-1084 is a phone address selected from a RingPool assigned to the marketing campaign.

Optionally, the above request may be tunneled over DNS or other name service by encoding the request as a name, such as in the following example:

58.1458.dynamic.example.com wherein the search keyword identifier (58) and marketing campaign identifier (1458) are attached and/or embedded as parameters of the DNS or other name service lookup. The response may be returned as in the following example response:

[SVR] tel:8884521084 wherein the Service Record (SVR) defining the DNS lookup response includes an attached and/or embedded phone address. An SRV record is conventionally a specification of data in the DNS defining the location (e.g., the hostname and port number), of servers for specified services.

In the example embodiment described above, the marketing campaign identifier and search keyword are passed as parameters of the request. Optionally, other parameters may be passed to the marketing and tracking system and may optionally include one or more of the following: parameters from cookies earlier set on the customer/customer prospect's browser, dynamic values populated by an associated marketing automation solution (e.g., date campaign email sent (day, month, and/or year), internal campaign email name, campaign id, email viewing context (send, preview, view as web page, view sent, forward-to-a-friend, landing page, validation, link resolution, short message service, voice, social, platform, site), customer/customer prospect email type (text or HTML), email id, profile attribute full name, customer/customer prospect id, email batch id, certain campaign email account attributes (batch id, job id), email reply name and/or address, other customized defined alphanumeric strings associated with campaign correspondence), a loyalty identifier (e.g., an ID code), mobile device information (e.g. phone device type, carrier, geo-location, phone address, short code, etc.) etc. Optionally, the name server protocol may have a limited length that is shorter than all the values that are to be tracked. Typically, one of the values is short enough and known to be unique. In that case, the initial tracking number can be retrieved using just that short, unique value. The remaining parameters may then be sent in subsequent requests without affecting the initial latency visible to the user (for example, after the web page has been rendered with the unique tracking number.)

Optionally, the name server protocol may have a limited character set alphabet. For example, the limited character set may be a subset of ASCII supported by the DNS. In the case that unsupported characters (e.g., Á, Ó, Ü, Ý) appear in the tracked values, the unsupported characters can first be mapped to a supported set of characters using an encoding syntax by which a string of Unicode characters is transformed uniquely and reversibly into a smaller, limited character set. For example, the ASCII characters in the string may be separated, out as follows. The ASCII characters in the string, that are included the limited character set, are copied and other characters in the string are skipped over and not copies. A character, such as an ASCII hyphen, may be added to the end of the copied characters to indicate that the resulting string excludes one or more characters from the original string. The excluded characters may be encoded as code numbers. The code numbers may then be re-encoded as ASCII sequences using ASCII characters included in the limited character set.

The server can reverse the process using said mapping protocol.

Thus, an efficient and well-known name server protocol may be used to tunnel dynamic number requests over a data network, such as the Internet, to a marketing and tracking system causing a timely display of a phone address in a web-page, browser, or other computing device application of a customer and/or customer prospect. Optionally, one or more tracking parameters corresponding to the customer and/or customer prospect may be included in the request. An Advantageous optional benefit of the name server tunneling approach is lower latency. In addition or instead, the name server tunneling approach may be used for a caching benefit. The name server protocol may cache results on one or more intermediate servers based on the configured Time To Live (TTL) sent with the original request. In particular, when a caching name server queries an authoritative name server for a resource record, it will cache that resource record for a time period specified by the configured TTL. If a stub resolver queries the caching name server for the same record before the TTL has expired, the caching server may reply with the cached resource record rather than having to retrieve the resource record from the authoritative name server again.

A feature of marketing automation and the marketing and tracking system is lead or prospect scoring. Lead scoring is a method of assigning a value (e.g., a numerical value) to leads in order to determine their willingness to purchase a company's product or service. Lead scoring is often used in conjunction with customer prospect nurturing. Leads with high scores can be accelerated through the nurturing funnel or fast-tracked to sales and, correspondingly, leads with low scores can be lead nurtured. In addition, lead scoring improves the efficiency of the sales and marketing process by enabling the organization to focus more attention on the higher quality leads.

The method of assigning or calculating a value (which may be calculated by the marketing and tracking system) is based at least in part upon a determined collection of attributes associated with the customer prospect. The attributes may include some or all of the following: demographic attributes (e.g., gender, age, ethnicity, language, disabilities, mobility, homeownership, employment status, credit status, geographic location, computing devices, mobile devices, telephony, etc.), psychographic attributes (e.g., personality traits, interests, lifestyles, values, attitudes, etc.), behavioral attributes (e.g., online usage (e.g., read emails, clicks, web visits, keywords, webinar participation, online social media participation, etc.), loyalty, etc.), and/or organization/firm demographics (e.g., company size, industry, job function, job title, etc.).

Lead/prospect scoring may be performed by the marketing and tracking system or otherwise, optionally combining explicit scoring and implicit scoring. Explicit scoring may be based at least in part on information the prospect declares (e.g., via an online or faxed registration form) and implicit scoring may be based at least in part upon information observed or inferred about the prospect (e.g., a link selection on a web page).

With respect to explicit scoring, for example, a value, such as a numerical value, is assigned to information declared by the prospect. Optionally, one or more internal or external data stores (e.g., a data service operated by a separate company) are queried to determine additional facts about the prospect based upon their declared data. Optionally, the marketing automation supports auto-fill forms linked to a user's social media site. Optionally, certain declared data is weighted by importance, for example, a prospects job title can be weighted heavier than his/her age.

With respect to implicit scoring, for example, a value, such as a numerical value, is assigned to information inferred about the prospect. Optionally, one or more external databases are queried to determine additional facts about the prospect based upon the inferred data. Optionally, certain inferred data is weighted by importance, for example, a website selection on a product associated link can be weighted heavier than a website selection on a corporate information associated link.

Optionally, the lead's score is determined at least in part by summing the weighted numerical values assigned to the lead across the explicit and implicit attributes. Optionally, the lead's score is further modified by adding or subtracting values, such as numerical points. For example, points might be subtracted from a lead score if some or all of the data is determined to be of low quality/relevance based upon, for example, additional information acquired using a prospect's phone number. If a company is selling year round active wear and it is determined the prospect's phone number is based in California, additional points might be added to the lead's score, as it is more likely that a California resident will be more interested in such type of clothing due to its moderate weather. In the same example, if the prospect's phone number is based in Michigan, additional points might be deducted from the lead's score, as it is less likely that a Michigan resident will be interested in such type of clothing due to its more extreme weather.

Optionally, lead scoring from online interactions is combined with offline interactions, and in particular, lead scoring associated with telephony/call processing. The combined lead scoring provides a deeper and more valuable lead scoring methodology than conventional marketing automation lead scoring. Optionally, attributes associated with, for example, the length of the call and/or the disposition of the call are included in the lead's score and/or the weighting of the lead's score as further described below. Optionally, the placement of calls to designated numbers may route calls directly to an operator (e.g. sales and/or customer support) or calls to such numbers may be configured to terminate in an IVR interface to provide data to and/or collect data from a user. Optionally, in both lead scoring and lead nurturing, information about a customer prospect and/or a customer is progressively assembled through a campaign and/or previous campaigns and stored (e.g., in a data store) in association with the customer prospect and/or customer (e.g., in a lead record). This information is used repeatedly to improve targeting of an existing campaign and/or for future campaigns.

Figure 3:
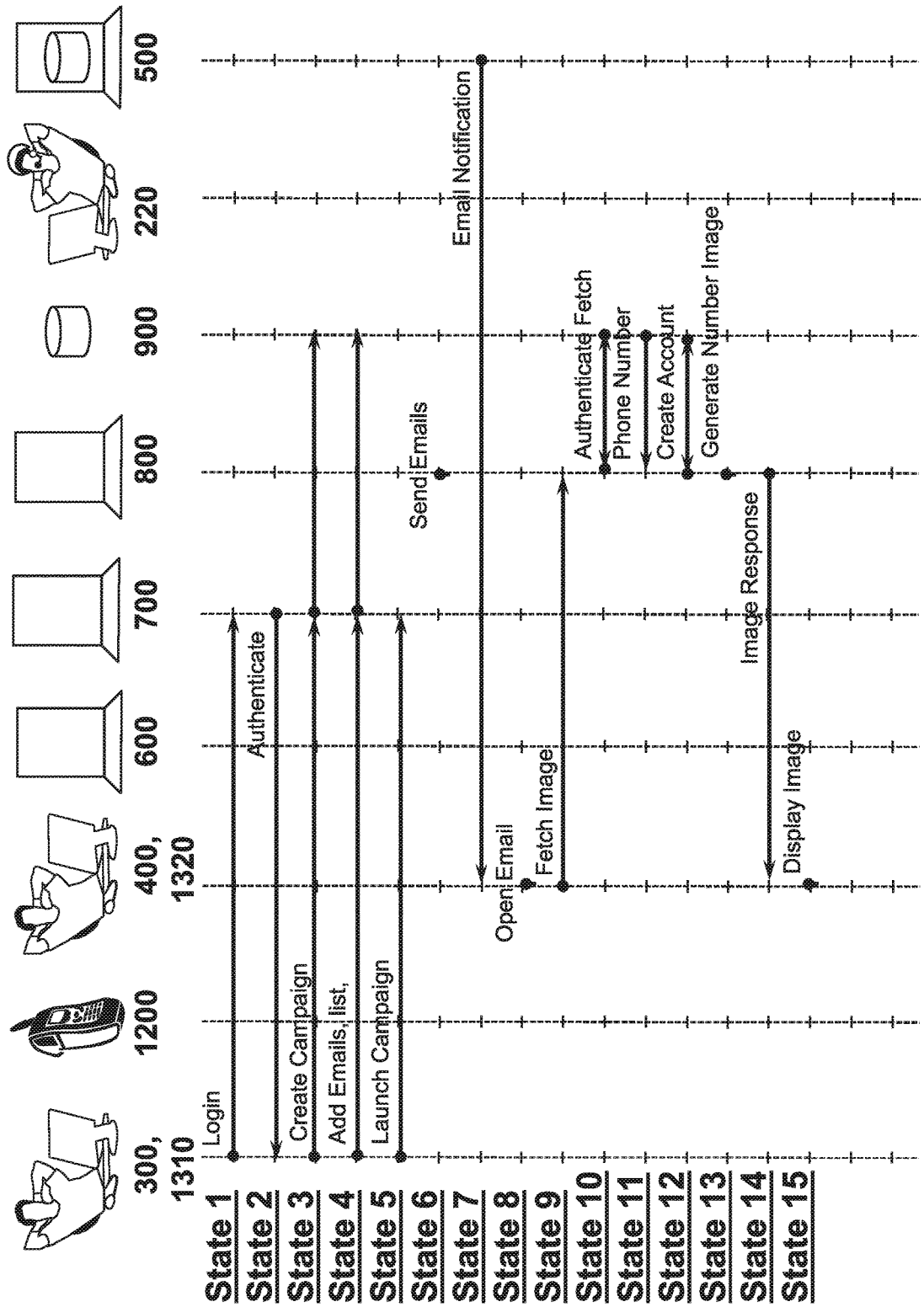
FIG. 3 and FIG. 4 illustrate an example first operating environment/process for a marketing tracking and communications system.
Figure 4:
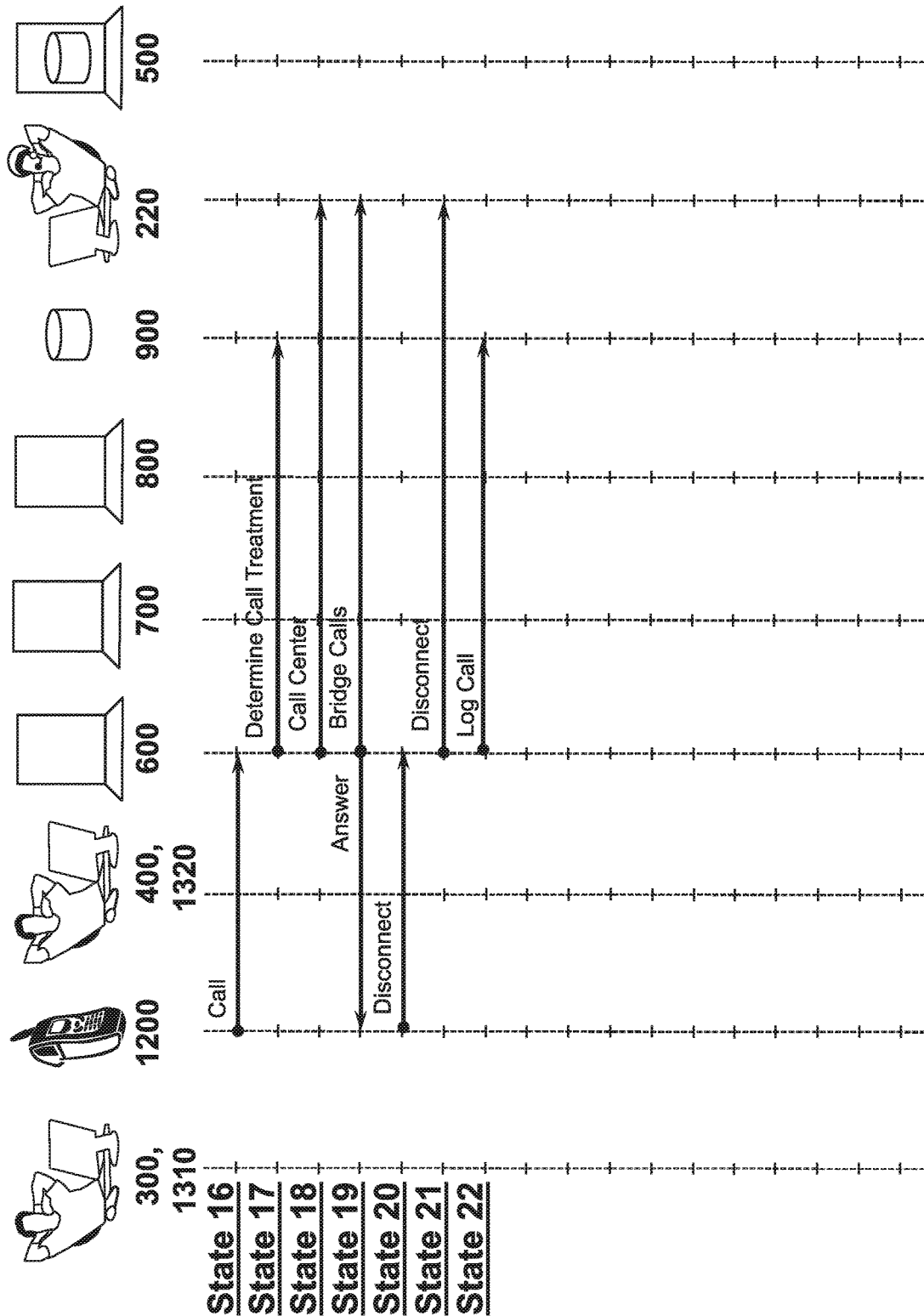

FIGS. 3 and 4 illustrate a first example operational flow of the system 1005 described above. Process states are listed on the left and elements of the operating environment of FIG. 2 are listed across the top. The states below depicts an example embodiment of the system 1005 in which a marketing campaign of a commercial airline, ACME Air, engages a collection of prospective customers regarding an air fare sale including vacation packages. In this example embodiment, the campaign provides dynamic number images in order to manage to costs of the campaign (including, for example, the cost of allocated phone addresses).

In the example embodiment below, the states below are intended to highlight/overview the operation of the system 1005 and not detail every operation of the system in an example marketing campaign. An example embodiment of a marketing campaign in association with a marketing and tracking system with integrated telephony is now described. In this example embodiment, the campaign is based at least in part upon sales demand generation using outbound email. In the example embodiment, the customer prospect's email provider does not support the execution of JavaScript programmatic access and display of a text string.

State 1 of FIG. 3. A user, for example a marketing manager 300, accesses over a data network 4000 a system, for example a marketing and tracking system with integrated telephony 1005, using, for example, a web-browser, a dedicated application, or otherwise hosted on a terminal 1300 (e.g., a desktop computer, laptop computer, tablet computer, smart phone, or other computing terminal). The user 300 enters their previously assigned unique identifier and password to gain access to the marketing and tracking system 1005.

State 2 of FIG. 3. The marketing and tracking system 1005, via a general purpose network-based server 700, receives and authenticates the marketing manager's entered credentials, by for example, accessing a stored customer user name and password stored in database 900.

State 3 of FIG. 3. After authentication by the system 1005 and subsystem server 700, optionally the marketing and tracking system 1005, via server 700, presents a user interface, for example a dashboard or home page, on the user terminal enabling the user to, among other things, create a marketing campaign by selecting, for example, an account marketing module user interface tab or control. The user optionally identifies the campaign, for example by entering a name identifier for the campaign (e.g., ACME Air Fare Sale). Optionally, a RingPool is assigned at this state to the marketing campaign. Optionally, the RingPool has a certain quantity of phone addresses in the RingPool. The created campaign is stored in a data store 900 of the marketing and tracking system 1005 via server 700. The system 1005, via server 700, may receive and store the campaign identification, and may store the association of the campaign with the RingPool.

State 4 of FIG. 3. Optionally, the user/operator 300 enters customer prospects by configuring into the campaign an email campaign lists from a data store 900 of lists or by accessing an email marketer external data store 950 via data network 4000. Optionally, the user/operator 300 associates an email (e.g., an air fare sale email template) with an email campaign lists. In this example embodiment, the campaign consists of a single email (other campaigns may consist of a series of emails). Because of the large number of email recipients of the campaign, the user chooses to use the dynamic number image feature. Thus, a phone address is not assigned to the email template at the launch of the campaign. Rather, the user specifies an image URL in a designated area of the template in which a phone address is meant to be displayed to the email recipient. In this example, the image URL takes the form "https://invoca.net/campaign_id/number.png?param1=<email>". The dynamic number image feature edits to the marketing campaign and email recipient list are received and stored in a data store 900 of the marketing and tracking system 1005 via server 700.

State 5 of FIG. 3. The marketing campaign (the ACME Air Fare Sale marketing campaign in this example) is launched in response to the user 300 selecting a campaign launch control on the Data Terminal 1300.

State 6 of FIG. 3. In this example, the marketing and tracking system sends the emails to the email addresses included in the email recipient list in response to the campaign launch control selection. Optionally, the email distribution itself is managed by a separate provider, for example, an email marketing provider.

State 7 of FIG. 3. A web email provider 500 receives the sent email. In response to the received email, the web email provider 500 notifies (e.g., via a display notification on a computing device 1320 of the customer prospect 400 or via a display on a mobile device 1200 of the customer prospect 400) the customer prospect 400 of the received email.

State 8 of FIG. 3. The customer prospect 400 opens the email, for example, by selecting the received ACME Air Fare Sale email from a list of emails displayed in a browser window hosted on the user's computing device 1320.

State 9 of FIG. 3. The opening of the email is a condition which initiates, at least in part, a one or more images to appear in the opened email displayed in the customer prospect's browser. One or more image fetch requests are issued, including for example, a fetch image request to a web server 800 (or image server). At least one of the image fetch requests is the dynamic number image URL defined in State 4.

State 10 of FIG. 3. The marketing and tracking system receives the dynamic number image fetch request from the browser hosted on the customer computing device 1320. In response to the received fetch image request, the marketing and tracking system 1005 (e.g., web server 800) parses the image fetch request. The marketing and tracking system 1005 authenticates the image fetch request is a valid request from an active marketing campaign, for example, by comparing one or more parameters of the fetch request against campaign parameters stored in the data store 900. The marketing and tracking system 1005, via server 800, also compares the email address received as a parameter in the image request with those email addresses of the marketing campaign. In this example, the email address matches a at least one originated marketing campaign email.

State 11 of FIG. 3. Subsequent to the marketing campaign validation, the marketing and tracking system 1005, via server 800, acquires a phone address from the RingPool associated with the campaign (see also State 3). The phone address assigned is the telephone number 1-800-123-4567 in this example.

State 12 of FIG. 3. The marketing and tracking system 1005 (e.g., using server 800 or 700) creates a customer prospect account in the data store 900 and stores in data store 900 the email address received in the image request parameter1 and the assigned telephone number 1-800-123-4567.

Figure 5:
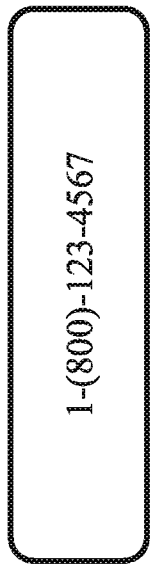
FIG. 5 illustrates an example image representation of a phone number.

State 13 of FIG. 3. The marketing and tracking system 1005, via server 700, generates an image 510 wherein the image 510 contains a visual representation of the phone address 1-800-123-4567 as illustrated in FIG. 5.

State 14 of FIG. 3. In response to the fetch request, the marketing and tracking system 1005, transmits the phone address image 510 from server 800 over a data network 4000 to the browser hosted on the computing device 1320 displaying the campaign email. Optionally, a cache-control element is included in the response to prevent a network caching server(s) from caching the phone address image.

State 15 of FIG. 4. The phone address image is displayed in the campaign email to the customer prospect 400 via the customer computing device browser.

State 16 of FIG. 4. The customer prospect 400, upon reading the email chooses to act on the campaign email (e.g., chooses to purchase a vacation package described in the campaign email). The customer prospect 400 originates a phone call to the phone address 1-800-123-4567 displayed in the image. In this example, the call from the customer prospect 400 originates from a personal computing device 1200 (e.g., the customer prospect's smartphone) other than a computing device 1320 from which the email is displayed (in other examples, the call may be placed by a POTs wireline phone or via the computing device 1320 (e.g., via VoIP)). In this example, the call is a Wireless Public Switched Telephone Network 3000 call received, for example, at a phone server 600 over a trunk IP connection (e.g., a trunk connecting the phone server 600 to wireline and wireless phone networks). Optionally, a collection of conventional and/or non-conventional call signaling information associated with the call is received including, for example, call type (landline, cellular, data), forwarding, calling party identification, called party identification, charge number, call privacy indicator, call jurisdiction, etc.

State 17 of FIG. 4. Upon receiving the call, the phone server 600 queries the data store 900 using as a parameter the called phone number 800-123-4567. The phone server 600 determines from the query response the call is associated with the ACME Air Fare Sale campaign and the call is to be routed to an ACME Air call center 1-805-765-4321 with no call treatment (e.g., an interactive voice response session, one or more data base queries to determine additional information about the customer prospect 400, for example, from data stored in the customer prospect account or from signaling information associated with the call, etc.) applied to the call prior to routing.

State 18 of FIG. 4. The phone server 600 originates an outbound call to the ACME call center 220. Optionally, the outbound call is placed over an IP trunk connection.

State 19 of FIG. 4. Upon detection of answer on the outbound call to the ACME call center 220, the phone server 600 bridges the inbound call from the customer prospect 400 to the outbound call and answers the inbound call from the customer prospect 400, 1200. The phone server 600 optionally monitors the bridged call for the duration of the call. Optionally, the bridged call is recorded with the recording stored in data store 900 (or a data store associated with phone server(s) 600).

State 20 of FIG. 4. The customer prospect hangs up after interacting with the call agent. The phone server 600 detects the far-end disconnect.

State 21 of FIG. 4. Upon detection of the call termination event by the customer prospect 400, 1200 (or, on either leg of the bridged call), the phone server 600 terminates the call connection to the call agent 220 (or, the other leg of the call).

State 22 of FIG. 4. In this example, information associated with the call is stored in data store 900 in association with the account of the customer prospect 400 including but not limited to some or all of the following: the length of the call, the call termination event type, the order in which the call legs terminated, a recording of the bridged call, a transcription of the calls, any keywords detected in the call which may indicate interest by the customer prospect 400 in the sale of a product and/or service, etc. Optionally, the campaign is credited with causing an incoming call from a customer prospect 400. Optionally, an affiliate 200 and/or publisher associated with the email campaign is paid for the incoming call. Optionally, a lead score is applied and/or calculated based upon the call and/or the caller interaction. Optionally, the lead score is stored in association with the customer prospect account. Optionally, the inbound call is considered a marketing funnel state transition and the change of state and/or new state is stored in association with the customer prospect account.

As previously described above, there may be other marketing campaigns which may include a large population of target customer prospects wherein the customer prospect is associated with a displayable media platform including, for examples, a white paper download, a downloadable application, preinstalled application, etc. An example embodiment in these cases may generally follow the states described above. For example, in a downloadable application scenario, State 6 might comprise downloads and/or updates to an application (such as a messaging application capable of displaying advertisements and/or branding). Further in this example, State 8 trigger might be the activation of an application.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, etc. The terminals may optionally include displays, user input devices (e.g., touchscreen, keyboard, mouse, voice recognition, etc.), network interfaces, etc.

Many variations and modifications may be made to the above-described embodiments, the elements of which are to be understood as being among other acceptable examples. All such modifications and variations are intended to be included herein within the scope of this disclosure. The foregoing description details certain embodiments.

It is claimed:

1. A system comprising:
a computing device;
a data network interface;
non-transitory media storing instructions readable by the computing device, that when executed by the computing device, cause the computing device to:
associate a pool of potential system phone numbers with an email marketing campaign, the pool of potential system phone numbers associated by a marketing or tracking system;
transmit an email to a plurality of customer prospects associated with the email marketing campaign wherein the email is configured to fetch an image upon presentation to a customer prospect;
receive, via the data network interface, an image fetch request from an Internet-connected computing device of a customer prospect from the plurality of customer prospects wherein the image fetch request includes as a parameter an email address of the customer prospect;
dynamically select a phone number of the pool of potential system phone numbers based on the image fetch request and the email marketing campaign;
generate an image comprising at least the phone number selected from the pool of phone numbers associated with the email marketing campaign;
transmit the generated image to the Internet-connected computing device of the customer prospect; and
perform one of:
in response to receiving an email response from the customer prospect, originate an outbound call to a telephone number associated with the email address of the customer prospect; or
in response to receiving an inbound voice telephone call directed to the phone number selected from the pool of phone numbers associated with the email marketing campaign, route the inbound voice telephone call to a call center associated with the marketing campaign, wherein the inbound voice telephone call includes call signaling information including at least a calling party phone number; and
store one or more of the email address of the customer prospect, the calling party phone number, and the phone number selected from the pool of phone numbers in association with the email marketing campaign.

2. The system as defined in claim 1, the system instructions further causing the computing device to:
determine a location associated with the inbound voice telephone call from the customer prospect directed to the phone number selected from the pool of phone numbers associated with the email marketing campaign; and route the inbound voice telephone call to a call center selected from a plurality of call center locations based on the determined location associated with the inbound voice telephone call.

3. The system as defined in claim 1, the system instructions further causing the computing device to:

associate the call signaling information with the customer prospect; and store the call signaling information with the email address of the customer prospect.

4. The system as defined in claim 3, further comprising a telephony interface configured to be coupled to a Public Switched Telephone Network (PSTN); and wherein the inbound voice telephone call is via the telephony interface, and wherein the system instructions further causing the computing device to determine a location associated with the inbound voice telephone call from the customer prospect via the telephony interface.

5. The system as defined in claim 3, the system instructions further causing the computing device to store a call type indicating an inbound call type or an outbound call type and a call termination state indicating a near-end disconnect or a far-end disconnect.

6. The system as defined in claim 3, wherein the phone number selected from the pool of phone numbers comprises a phone number local to the customer prospect.

7. The system as defined in claim 1, wherein the phone number selected from the pool of phone numbers comprises a toll-free phone number.

8. The system as defined in claim 1, wherein the email address of the customer prospect received via the image fetch request matches an email address configured in the email transmission to the plurality of customer prospects associated with the email marketing campaign.

9. The system as defined in claim 1, wherein the generated image transmitted to the Internet-connected computing device of the customer prospect is configured to be displayed to the customer prospect via a web-based email user interface.

10. The system as defined in claim 1, wherein the image fetch request comprises an image Universal Resource Locator (URL) request.

11. A system comprising:
a computing device;
a data network interface;
non-transitory media storing instructions readable by the computing device, that when executed by the computing device, cause the computing device to:
transmit an email to a plurality of customer prospects associated with a marketing campaign wherein the email is configured to fetch an image upon presentation to a customer prospect;
receive, via the data network interface, an image fetch request from an Internet-connected computing device of a customer prospect from the plurality of customer prospects associated with the marketing campaign wherein the image fetch request includes as a parameter a customer prospect identifier;
dynamically select a phone address of a pool of potential system phone addresses based on the image fetch request and the email marketing campaign, the pool of potential system phone addresses associated by a marketing or tracking system;

generate an image comprising at least the phone address selected from the pool of potential system phone addresses associated with the marketing campaign;
transmit the generated image to the Internet-connected computing device of the customer prospect; and
perform one of:
in response to receiving an email response from the customer prospect, originate an outbound call to a telephone number associated with the email address of the customer prospect; or
in response to receiving an inbound voice telephone call directed to the system phone address selected from the pool of potential system phone addresses associated with the email marketing campaign, route the inbound voice telephone call to a call center associated with the marketing campaign, wherein the inbound voice telephone call includes call signaling information including at least a calling party phone address; and
store one or more of the email address of the customer prospect, the calling party phone address, and the system phone address selected from the pool of potential system phone addresses in association with the email marketing campaign.

12. The system as defined in claim 11, the system instructions further causing the computing device to:

determine a location associated with the inbound voice telephone call from the customer prospect directed to the system phone address selected from the pool of potential system phone addresses associated with the marketing campaign; and route the inbound voice telephone call to a call center selected from a plurality of call center locations based on the determined location associated with the inbound voice telephone call.

13. The system as defined in claim 11, further comprising a telephony interface configured to be coupled to a Public Switched Telephone Network (PSTN);

wherein the inbound voice telephone call is via the telephony interface; and wherein the system instructions further causing the computing device to determine a location associated with the inbound voice telephone call from the customer prospect via the telephony interface.

14. The system as defined in claim 11, the system instructions further causing the computing device to:

associate the call signaling information with the customer prospect; and store the call signaling information with the email address of the customer prospect.

15. The system as defined in claim 11, wherein the system instructions further causing the computing device to store one or more of a call type and a call termination state in association with the system phone address, the call type indicating an inbound call type or an outbound call type and the call termination state indicating a near-end disconnect or a far-end disconnect.

16. The system as defined in claim 11, wherein the customer prospect identifier received via the image fetch request comprises an email address and the email address matches an email address configured in the email transmission to the plurality of customer prospects associated with the marketing campaign.

17. The system as defined in claim 11, wherein the customer prospect identifier received via the image fetch request comprises one of a customer account number; or a unique system generated number; and wherein the generated image transmitted to the Internet-connected computing device of the customer prospect is configured to be displayed to the customer prospect via a web-based email user interface.

18. A system comprising:
a computing device;
a data network interface;
non-transitory media storing instructions readable by the computing device, that when executed by the computing device, cause the computing device to:
receive, via the data network interface, an image fetch request from an Internet-connected computing device of a customer prospect wherein the image fetch request originates at least in part from an application hosted on an Internet-connected computing device and wherein the image fetch request includes a customer prospect identifier;
dynamically select a phone address of a pool of potential system phone addresses based on the image fetch request and an email marketing campaign, the pool of potential system phone addresses associated by a marketing or tracking system;
generate an image comprising at least the phone address selected from the pool of potential system phone addresses associated with the marketing campaign;
transmit the generated image to the Internet-connected computing device of the customer prospect; and
perform one of:
in response to receiving an email response from the computing device of the customer prospect, originate an outbound call to a telephone number associated with the email address of the customer prospect; or
in response to receiving an inbound voice telephone call directed to the system phone address selected from the pool of potential system phone addresses associated with the email marketing campaign, route the inbound voice telephone call to a call center associated with the marketing campaign, wherein the inbound voice telephone call includes call signaling information including at least a calling party phone address; and
store one or more of the email address of the customer prospect, the calling party phone address, and the system phone address selected from the pool of potential system phone addresses in association with the email marketing campaign.

19. The system as defined in claim 18, the system instructions further causing the computing device to:
determine a location associated with the inbound call directed to the system phone address selected from the pool of potential system phone addresses associated with the marketing campaign; and
route the inbound voice telephone call to a call center selected from a plurality of call center locations based on the determined location associated with the inbound voice telephone call.

20. The system as defined in claim 19, further comprising a telephony interface configured to be coupled to a Public Switched Telephone Network (PSTN);
wherein the inbound voice telephone call is via the telephony interface; and
wherein the system instructions further causing the computing device to determine a location associated with the inbound voice telephone call from the customer prospect via the telephony interface.

* * * * *